Patented Sept. 17, 1935

2,014,546

UNITED STATES PATENT OFFICE 2,014,546

CYANIDE COMPOSITION AND PROCESS OF MAKING THE SAME

Hoylande Denune Young, Oak Park, Ill., assignor to Van Schaack Bros. Chemical Works, Inc., Chicago, Ill., a corporation of Illinois No Drawing. Application May 28, 1930, Serial No. 456,825

16 Claims. (Cl. 260—99.30)

This invention relates to a cyanide composition and, more particularly, to one comprising cyanides derived from unsaturated substances present in the products from the cracking of petroleum. A further object of the invention is to provide a process for the manufacture of cyanide compositions from such unsaturated substances.

These cyanide compositions may be used for purposes for which known alkyl cyanides of approximately equal boiling points are now used. Or, the cyanides produced according to this invention may be employed as a means of making fatty acids or derivatives of fatty acids, as, for example, by hydrolysis with an aqueous solution of sodium hydroxide or by treatment with an alcoholic solution of hydrochloric acid containing some water; this latter reaction produces an ester composition.

The invention is illustrated by the following example of means of practising it.

Liquid petroleum, suitably so-called "gas oil", is submitted to cracking, preferably in the vapor phase, at a temperature between 500 and 600° C. and at a pressure not substantially above atmospheric. Regardless of the nature of the cracking process used, whether liquid-phase or vapor-phase, the products of the cracking will comprise unsaturated substances. When the cracking has been done at a relatively high temperature and low pressure, as in the vapor-phase, the proportion and character of unsaturated substances are particularly suitable for the purposes of this invention.

I may use cracked petroleum products of various boiling points. Thus, I may use the fraction comprising gaseous products of boiling point below 30° C. at atmospheric pressure and/or a liquid fraction, as, for example, a fraction that can be distilled completely at a temperature below 250° C. at atmospheric pressure or below 250° C. at a pressure equal to 10 mm. of mercury. In general, I choose the petroleum fraction that will give, in the treatment described below, cyanides of the desired number of carbon atoms or boiling point. Thus a fraction of cracked petroleum of such boiling range as to include the amylenes would be selected as raw material for synthesizing a composition comprising amyl cyanides. A cracked petroleum distillate that is liquid at ordinary temperatures, as, for example, a fraction that distils substantially completely between 30° and 100° C., 100° and 200° C., or above 200° C., would be selected for use in the manufacture of higher cyanides. It should be pointed out that a feature of this invention is the production of compositions comprising isomeric saturated cyanides, dicyanides, and/or unsaturated cyanides. By the term "unsaturated cyanides" I mean cyanides that contain at least one pair of doubly linked or trebly linked carbon atoms in the radical joined to the cyanide group. Examples of such unsaturated cyanides are represented by the general formulas $C_nH_{2n-1}-CN$ and $C_nH_{2n-3}-CN$, in which $n$ represents an integral member that is greater than 1, and, suitably, less than 20, as, for example, 6 to 17.

Having selected the fraction of cracked petroleum in accordance with the above considerations, I next treat it with sulfuric acid, to convert unsaturated substances in part to compounds with sulfuric acid. Thus an olefine gives an alkyl sulfate according to one of the following equations in which $n$ has the same meaning as above:

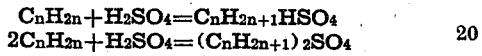
$$C_nH_{2n}+H_2SO_4=C_nH_{2n+1}HSO_4$$
$$2C_nH_{2n}+H_2SO_4=(C_nH_{2n+1})_2SO_4$$

Preferably, I produce a reaction of the second type by the use of an excess of unsaturated material, olefine, di-olefine, etc., over the amount of sulfuric acid used. In order to avoid polymerizing a large part of the unsaturated material present in the fraction of cracked petroleum, I choose concentrations of sulfuric acid and temperatures of reaction that give satisfactory rates of reaction of the acid with the unsaturated hydrocarbons without excessive polymerization of the hydrocarbons. Thus I may use to advantage temperatures between —20° and +35° C. and sulfuric acid of concentrations of 40% and 87% by weight, suitably 50 to 70%. I use sulfuric acid of the higher concentrations and/or the higher temperatures with cracked petroleum fractions distilling completely below 30° C. and lower concentrations and/or lower temperatures with higher boiling fractions of cracked petroleum. In treating a fraction of hydrocarbon that distils completely below 30° C., I may absorb it in 70 to 85% sulfuric acid at 10 to 30° C., or, I may pass the material, in vapor form, at 30° C., through a series of absorption towers containing respectively 60%, 70%, and 85% sulfuric acid. When the acid in any tower is combined to a substantial degree, as, for example, nearly completely, with unsaturated hydrocarbons, then this acid liquor is replaced by fresh acid of the concentration originally used in that tower.

If a liquid fraction of cracked petroleum product is used, as, for example, one of those of distillation range given above, it may be treated with sulfuric acid of one of the concentrations and at a temperature specified above. Thus the treatment may be made with 60% sulfuric acid at 0 to 30° C., suitably at 0 to 15° C. Or, the liquid fraction may be stirred successively with portions of sulfuric acid of concentration 40, 50, 60, 70, and 80%, respectively.

The resulting liquor or any portion thereof, in which a part or, preferably, substantially all of the acid is combined with hydrocarbons, is allowed to settle. The upper or oil layer, comprising polymerized hydrocarbons, is then separated. The lower layer comprising sulfates of hydrocarbon radicals, as, for instance, alkyl hydrogen sulfates and/or dialkyl sulfates, is stirred vigorously with an aqueous solution of sodium or potassium cyanide, to give an organic cyanide composition and inorganic sulfate, according to the type equations, $$C_nH_{2n+1}HSO_4 + 2NaCN = C_nH_{2n+1}CN + Na_2SO_4 + HCN$$

$$(C_nH_{2n+1})_2SO_4 + 2NaCN = 2C_nH_{2n+1}-CN + Na_2SO_4$$

in which $n$ has the same meaning as defined above. If it is desired to minimize the formation of hydrocyanic acid, as shown in the first of the immediately preceding equations, the free sulfuric acid or the monoalkyl hydrogen sulfate in the acid liquor may be combined with an excess of alcohols, suitably the alcohols corresponding to the radicals present in the partially saturated sulfuric acid, before the cyanide is added.

The reaction of the inorganic cyanide with the acid liquor may be conducted at 0 to 30° C., suitably at 20° C.

The organic cyanides resulting from the above reaction will form a layer of oil and/or crystals on a lower layer comprising water and sodium sulfate. Ordinarily, sufficient hydrocarbon material, such as polymers, is present to give fairly good extraction of the cyanides from the aqueous layer. If such is not the case, extraction may be made with an organic liquid that is completely miscible with the cyanides but not with water, such, for example, as benzene and/or ether.

The mixture of cyanides and polymerized petroleum hydrocarbons may be used or the cyanides may be separated and purified by usual means, as, for example, by distillation at atmospheric pressure or reduced pressure and/or by crystallization.

Among the cyanides that may be prepared in this way are those corresponding to many of the secondary and tertiary alcohols containing 4 to 20 carbon atoms to the molecule, as, for example, 6 to 17.

Many of the details given above may be varied without departing from the spirit of my invention. Other methods may also be used. Thus, the sulfuric acid used may be substituted by an aqueous solution of hydrochloric or other halogen acid. The reaction of the inorganic cyanide with the liquor comprising alkyl sulfates may be hastened by the use of elevated temperatures; the temperature should not be allowed to rise to the point where the mixture either boils or shows signs of decomposition. The inorganic cyanide may be used in powdered form or in the presence of ethyl and/or methyl alcohol. Catalysts, such as salts of metals, as, for example, the chloride and/or sulfate of copper or silver, may be present during the interaction of the unsaturated hydrocarbon with the sulfuric acid and the subsequent reaction with inorganic cyanide.

By the term "cyanides corresponding to unsaturated hydrocarbons" as used in the claims or elsewhere, I mean cyanides produced or derivable from some or all of the unsaturated products present in cracked petroleum, by addition of hydrogen cyanide (HCN), directly or indirectly at the double bond.

I may heat a mixture of hydrogen cyanide and unsaturated substances present in cracked petroleum products, especially those from vapor-phase cracking, under a pressure of 5 to 100 atmospheres, suitably in the presence of a catalyst, as, for example, sulfuric acid, formic acid, and/or sodium bisulfate.

I claim:

1. A mixture of cyanides formed by causing the addition of hydrogen cyanide at unsaturated bonds of the unsaturated hydrocarbons present in cracked petroleum.

2. A mixture of cyanides formed by causing the addition of hydrogen cyanide at unsaturated bonds of the unsaturated hydrocarbons present in vapor-phase cracked petroleum.

3. A mixture of cyanides formed by causing the addition of hydrogen cyanide at unsaturated bonds of the unsaturated hydrocarbons present in a fraction of cracked petroleum distilling above 30° C.

4. A mixture of cyanides formed by causing the addition of hydrogen cyanide at unsaturated bonds of the unsaturated hydrocarbons present in a fraction of cracked petroleum distilling above 30° C. and below 250° C. at 10 mm. pressure.

5. A mixture of cyanides formed by causing the addition of hydrogen cyanide at unsaturated bonds of the unsaturated hydrocarbons present in a fraction of cracked petroleum distilling above 30° C. and below 250° C. at atmospheric pressure.

6. Cyanides formed by causing the addition of the hydrogen cyanide at unsaturated bonds of the unsaturated hydrocarbons of cracked petroleum, mixed with polymers formed concurrently from said hydrocarbons in the presence of sulfuric acid.

7. A mixture of alkyl cyanides formed by causing the addition of the hydrogen cyanide at unsaturated bonds of the unsaturated hydrocarbons present in cracked petroleum of boiling point above 30° C.

8. A mixture of alkyl and unsaturated cyanides formed by causing the addition of hydrogen cyanide at unsaturated bonds of the unsaturated hydrocarbons present in cracked petroleum of boiling point above 30° C. and below 250° C. at atmospheric pressure.

9. The process of making cyanides corresponding to the unsaturated hydrocarbons present in cracked petroleum, which comprises the step of reacting an inorganic cyanide, soluble in the reaction mixture, with a reaction product of an acid of the group consisting of sulfuric and the hydrohalogen acids with said unsaturated hydrocarbons, the reaction mixture having an acid reaction.

10. The process of making cyanides corresponding to the unsaturated hydrocarbons present in cracked petroleum, which comprises the step of reacting an inorganic cyanide, soluble in the reaction mixture, with a reaction product of sulfuric acid with said unsaturated hydrocarbons, the reaction mixture having an acid reaction.

11. The process of making cyanides corresponding to the unsaturated hydrocarbons present in cracked petroleum, which comprises the step of reacting an inoranic cyanide, soluble in the reaction mixture, with a reaction product of an acid of the group consisting of sulfuric and the hydrohalogen acids with said unsaturated hydrocarbons, substantially all of the acid being so combined, but the reaction mixture having an acid reaction.

12. The process of making cyanides which comprises treating a liquid fraction of vapor-phase cracked petroleum with diluted sulfuric acid, and then treating the resulting sulfuric acid compounds with an inorganic cyanide soluble in the reaction mixture the reaction mixture having an acid reaction.

13. The process of making cyanides which comprises treating a liquid fraction of vapor-phase cracked petroleum with diluted sulfuric acid, and then treating the resulting sulfuric acid compounds with an inorganic cyanide in alcoholic solution the reaction mixture having an acid reaction.

14. The process of making cyanides which comprises treating a liquid fraction of vapor-phase cracked petroleum with sulfuric acid of concentration between 40 and 87%, and then treating the resulting sulfuric acid compounds with an inorganic cyanide soluble in the reaction mixture the reaction mixture having an acid reaction.

15. The process of making cyanides which comprises treating a liquid fraction of vapor-phase cracked petroleum with sulfuric acid of approximately 60% concentration at a temperature below 20° C., and then treating the resulting sulfuric acid compounds with sodium cyanide the reaction mixture having an acid reaction.

16. The process of making cyanides which comprises treating a liquid fraction of vapor-phase cracked petroleum with diluted sulfuric acid, then treating the resulting sulfuric acid compounds with an inorganic cyanide, soluble in the reaction mixture, and separating the resulting cyanides by distillation and crystallization.

HOYLANDE D. YOUNG.